United States Patent [19]

Schneider et al.

[11] Patent Number: 4,638,325

[45] Date of Patent: Jan. 20, 1987

[54] INK JET FILAMENT LENGTH AND STIMULATION AMPLITUDE ASSESSMENT SYSTEM

[75] Inventors: John M. Schneider, Spring Valley; Michael J. Piatt, enon; Mark E. Brown, West Carrollton; Mark C. Bowers, Vandalia, all of Ohio

[73] Assignee: Eastman Kodak Company, Rochester, N.Y.

[21] Appl. No.: 773,496

[22] Filed: Sep. 9, 1985

[51] Int. Cl.$^4$ .............................................. G01D 18/00

[52] U.S. Cl. ......................................... 346/1.1; 346/75

[58] Field of Search .................................... 346/1.1, 75

[56] References Cited

U.S. PATENT DOCUMENTS

| | | | |
|---|---|---|---|
| 3,761,941 | 9/1973 | Robertson | 346/75 |
| 3,866,237 | 2/1975 | Meir | 346/75 |
| 3,992,713 | 11/1976 | Carmichael et al. | 346/75 |
| 4,016,571 | 4/1977 | Yamada | 346/75 |
| 4,219,822 | 8/1980 | Paranjpe | 346/75 |
| 4,318,480 | 3/1982 | Lombardo et al. | 209/3.1 X |
| 4,318,481 | 3/1982 | Lombardo et al. | 209/3.1 X |
| 4,417,256 | 11/1983 | Fillmore et al. | 346/75 |
| 4,524,366 | 6/1985 | Yamada | 346/75 |

OTHER PUBLICATIONS

IBM Technical Disclosure Bulletin, vol. 22, No. 7, Dec. 1979, p. 2666, "Satellite Drop Detection", by G. L. Ream.

*Primary Examiner*—E. A. Goldberg
*Assistant Examiner*—Gerald E. Preston
*Attorney, Agent, or Firm*—Thomas H. Close

[57] ABSTRACT

The length of an ink jet filament as a function of stimulation amplitude is measured in an ink jet printing apparatus by locating a narrow charging electrode near the drop break-off point of the ink jet filament, varying the stimulation amplitude to vary the filament length, and measuring the amount of charge imparted to the ink drops as the filament length is changed. Stimulation amplitude is automatically adjusted by as a function of the measured charge.

30 Claims, 9 Drawing Figures

INK JET FILAMENT LENGTH AND STIMULATION AMPLITUDE ASSESSMENT SYSTEM

TECHNICAL FIELD

The invention relates to continuous ink jet printing, and more particularly to a method and apparatus for sensing the length of an ink jet filament in response to the amplitude of a stimulation signal applied to the printing head of an ink jet printer, and for adjusting the amplitude of the stimulation signal in response to the filament length.

BACKGROUND ART

In a continuous ink jet printer, a continuous jet of ink is expelled from an orifice in a print head to form an ink jet filament. The ink jet is stimulated by a periodic disturbance induced by a stimulation signal applied to the ink jet head, to cause the ink jet to reliably break up into an evenly spaced series of drops. The distance from the orifice to the point of drop separation is called the ink jet filament length. The trajectories of the ink drops are controlled by inducing charge in the conductive ink jet filament at the moment of drop separation by means of a charging electrode located near the point of drop separation. Charge induced in the ink jet filament is trapped in the ink drops as they separate from the filament, and the path of a drop is determined by the interaction of the charged drop with a local electric field.

In a "binary" type continuous ink jet printer, drops are either charged or not by applying a voltage pulse to the charging electrode. Charged drops are deflected into a catcher from which the ink is recirculated, and uncharged drops proceed to an ink receiving surface, such as paper. In another type of continuous ink jet printer, printing drops are deflected along a plurality of paths determined by the amount of charge induced on the drops, more highly charged drops being deflected more than less highly charged drops.

In such continuous ink jet printing, the length of the ink jet filament varies as a function of the amplitude of the stimulation signal applied to the ink jet print head. Variables such as ink pressure, temperature, and viscosity affect the relationship between the filament length and the stimulation amplitude. Generally, at low stimulation amplitude, the ink jet filament is relatively long. As the stimulation amplitude is increased, the filament shortens until a minimum filament length is reached. As the stimulation amplitude is further increased, the ink jet filament begins to lengthen again. It has been found through experimentation that in this region of operation beyond the minimum filament length (called overdrive), ink drop satellites are uncontrollably formed. This makes accurate ink drop control difficult. It is therefore desirable to avoid operating the ink jet head in the region of overdrive.

There is a need therefore to have a means for sensing the filament length as a function of stimulation amplitude so that the stimulation amplitude applied to the ink jet print head may be automatically adjusted so as to avoid the region of overdrive. This is especially true since the relationship between the filament length and stimulation amplitude changes due to changes in ink viscosity, temperature and pressure.

U.S. Pat. No. 4,417,256 issued Nov. 22, 1983 to Filmore et al discloses a system for adjusting the stimulation amplitude in a multi-jet continuous ink jet printer. In the apparatus disclosed by Filmore et al, the filament length is inferred from a measurement of the time of flight of an ink drop, the longest time of flight corresponding to the shortest filament length, and vice versa. The time of flight is determined by measuring the time it takes for a charged drop to reach a drop sensor located downstream from the charging electrode. The starting time $t_0$ is taken as the midpoint of the charging signal.

Because the actual starting time of the ink drops (i.e., the time that the drops break off from the filament, called the "separation phase" of the drops) is a function of the stimulation amplitude, this method of inferring filament length actually measures a function of both filament length and drop separation phase as a function of stimulation amplitude, and is effective only for comparing one filament length to another, but not for measuring the length of any one ink jet filament. Furthermore, in the method of stimulation setting proposed by Filmore, some of the ink jets are overdriven, thereby risking the formation of satellites.

It is therefore the object of the present invention to provide a method and apparatus for measuring filament length in an ink jet print head as a function of stimulation amplitude independent of drop separation phase.

It is a further object of the invention to provide a method and apparatus for automatically adjusting stimulation amplitude as a function of filament length independent of drop separation phase in an ink jet print head.

DISCLOSURE OF THE INVENTION

The objects of the present invention are achieved by locating a narrow charging electrode adjacent the ink jet filament at a sensing location near the drop separation location; varying the amplitude of the stimulation signal to vary the length of the ink jet filament, and hence the distance between the charging electrode and the drop separation location; detecting the magnitude of the charge induced on the ink drop by the narrow charging electrode; and sensing the length of the ink jet filament as a function of the magnitude of the detected charge. The term 'narrow charging electrode' means that the charging electrode extends less than one center-to-center drop spacing in the direction of the ink jet filament.

According to a further feature of the invention, the filament length sensor is employed to adjust the stimulation amplitude to avoid the region of overdrive. A peak in the charge imparted to the ink drops is detected indicating the minimum filament length, and the stimulation amplitude is set at a predetermined value lower than the amplitude that produces the peak charge.

In one mode of practicing the invention, the filament length sensor is employed with a multi-jet ink jet printing head having a linear array of planar drop charging electrodes. The narrow charging electrode comprises a sheet of conductive material, an edge of the sheet being located opposite the array of planar drop charging electrodes, and forming the narrow charging electrode for the multiple jets. An electrometer electrode located in a nose cup in a storage and startup station measures the charge imparted to the jets by the narrow charging electrode as the stimulation amplitude is varied.

In a presently preferred mode of practicing the invention, a pair of narrow charging electrodes separated by a thin insulating layer are arranged opposite the array of planar drop charging electrodes. Voltages of opposite polarity are applied to the narrow charging electrodes. The magnitudes of the voltages are selected such that a drop breaking off opposite the thin insulating layer will receive a charge of zero volts. The electrometer senses when the charge imparted to the jet stream is zero, to determine the length of the ink jet filament exactly.

MODES OF CARRYING OUT THE INVENTION

Figure 1:
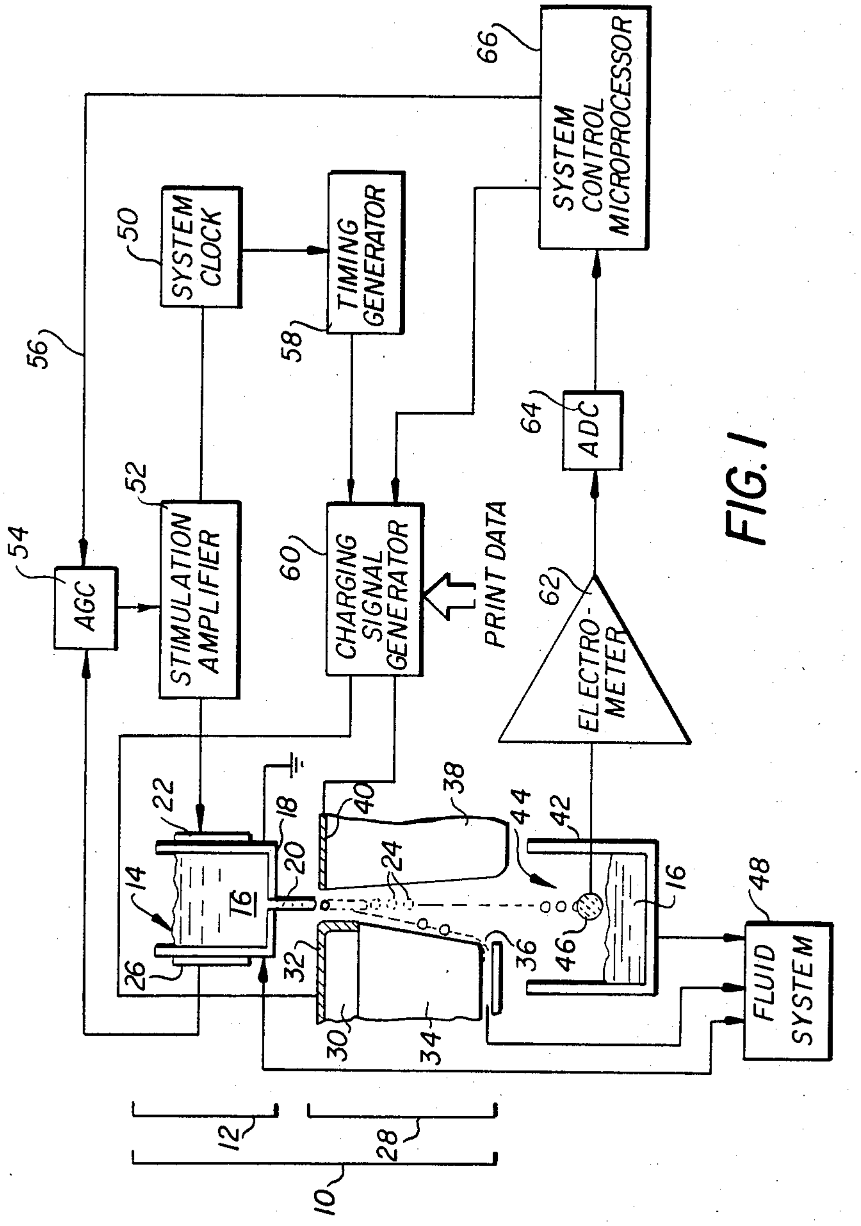
FIG. 1 is a schematic diagram showing an ink jet printing head having filament length measuring apparatus according to the present invention.

Referring to FIG. 1, a continuous binary ink jet printing head is shown schematically in cross section, along with associated electronics for practicing the present invention. The printing head is of the type shown in U.S. patent application No. 390,105 filed June 21, 1982 in the name of Braun. The ink jet printing head 10 includes an upper head portion 12 defining an ink reservoir 14 containing, under pressure, conductive ink 16. The pressurized ink is forced through an orifice plate 18 to produce an ink filament 20.

A piezoelectric transducer 22 is mechanically coupled to the upper head portion 12 of the ink jet print head for inducing mechanical vibrations in the upper head portion, and thereby in the ink, to stimulate controlled breakup of the ink filament into drops 24. A piezoelectric feedback transducer 26 measures the amplitude of stimulation imparted to the upper head portion 12 by the transducer 22.

The ink jet printing head includes a lower portion 28 having a charging plate 30, with a drop charging electrode 32 arranged adjacent the ink jet filament 20 for inducing charges on the ink drops 24 as they separate from the ink filament 20. Charged drops are deflected into the face of a drop catcher 34 where they are collected into an ink gutter 36 comprising a slot at the bottom of the drop catcher 34.

A protective member 38 for protecting the surface and charge plates from dust is provided opposite the catcher face 34. A narrow drop charging electrode 40, extending equal to or less than one center-to-center drop spacing in the direction of the ink jet filament, is located on the top of the protective member 38 across from the drop charging electrode 32. The narrow drop charging electrode 40 is employed as part of the filament length sensing apparatus described below. The center-to-center drop spacing in a continuous ink jet printer is determined by the wavelength λ of stimulating excitation induced in the ink jet filament. In all continuous ink jet printers, λ/d, where d is the diameter of the ink jet filament, falls in the range of about 4 to 5. Thus, for an ink jet having 3 μm diameter, the center-to-center drop spacing would be 12 to 15 μm, and the length of the narrow charging electrodes would be equal to or less than 12 to 15 μm.

A nose cup 42 is provided at a storage and startup station (not shown) arranged at a suitable location within the ink jet printer. When the ink jet printing head 10 is not being used to print, it is positioned over the nose cup 42. The nose cup defines an ink sump 44 for receiving ink drops from the ink jet print head that are not sufficiently charged to be deflected onto the drop catcher 34. An electrometer electrode 46 is located in the nose cup 42 in a position to receive the electrical charge carried by the ink drops entering nose cup 42.

A fluid system 48, hydraulically connected to the print head 10, and nose cup 42, supplies the conductive ink, under pressure, to ink reservoir 14 in the upper head portion 12 of the printing head, and recirculates the ink from the ink gutter 36 in the lower portion 28 of the ink jet printing head, and recirculates the ink from the sump 44 and the nose cup 42.

The ink jet printer electronics includes a system clock 50 that supplies a periodic clock signal (e.g., 75 kz) to a stimulation amplifier 52. The output of the stimulation amplifier is applied to the piezoelectric transducer 22 on the upper head portion 12 of the ink jet printing head 10. The gain of the stimulation amplifier, and hence the amplitude of the stimulation signal is controlled by an automatic gain control servo 54. The automatic gain control servo 54 receives a reference level signal on line 56, and a feedback signal from feedback transducer 26, and controls the gain of the stimulation amplifier such that the feedback signal matches the reference signal.

The clock signal from the system clock is also provided to a timing generator 58 that produces timing pulses that determine the phase of the printing pulses that are applied to charging electrode 32. The timing pulses are applied to a charging signal generator 60 that receives a digital print data signal during printing and generates the printing pulses that are applied to the charging electrodes 32. The charging signal generator also generates a low charging voltage that is applied to the narrow charging electrode 40 during filament length measurement.

An electrometer 62 is connected to the electrometer electrode 40, and generates an analog signal that is proportional to the ink jet current incident on the electrometer electrode 40. The analog output signal of the electrometer is supplied to an analog to digital convertor 64 to produce a digital signal indicative of the ink jet current sensed by the electrometer 62.

A system control microprocessor 66 receives the digital ink jet current signal from the electrometer 62 and is programmed as described below, to control the gain of the stimulation amplifier 52 by providing a reference signal to automatic gain control circuit 54 on line 56.

Figure 2:
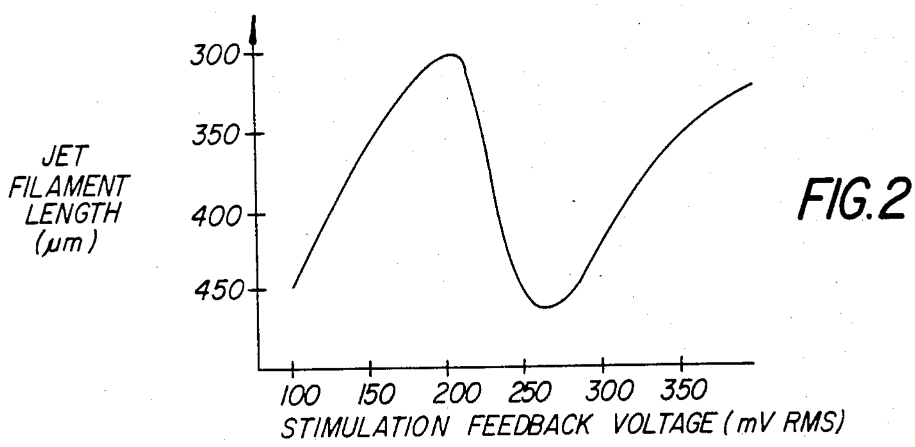
FIG. 2 is a plot showing filament length as a function of stimulation amplitude.
Figure 3:
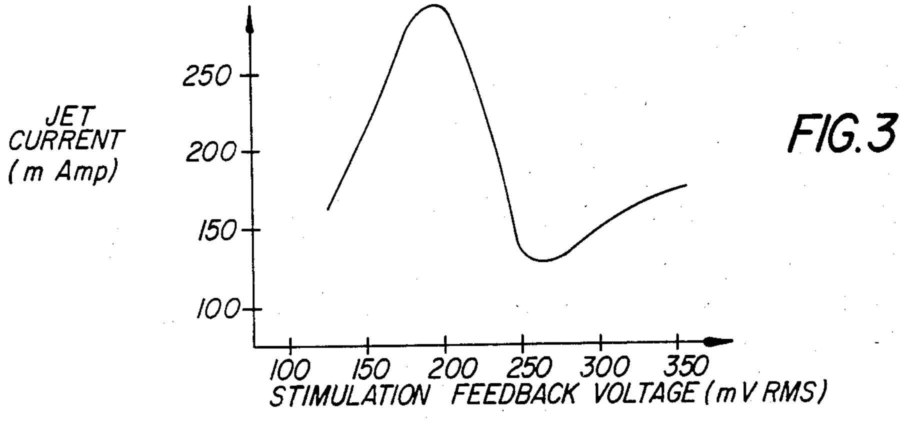
FIG. 3 is a plot showing the current induced on the ink jet by the narrow charging electrode as a function of stimulation amplitude.

The general principle of operation of the present invention will now be described with reference to FIGS. 2 and 3. FIG. 2 is a graph showing the relationship between ink jet filament length and stimulation amplitude as measured by visual observation. The natural filament length of an unstimulated jet is relatively long and drop formation is unpredictable. This region is called underdrive. As the stimulation amplitude is increased, as was measured by the increase in stimulation feedback voltage from the piezoelectric feedback transducer 26, the filament gets shorter, until a minimum filament length is approached. This is the region of normal operation. At this point, a further increase in stimulation amplitude causes the filament to reach a minimum and then lengthen again. In the region of stimulation above the minimum filament length, called overdrive, satellite drops are produced, and as a result drop deflection is difficult to control. For this reason it is desirable to avoid the region of overdrive when operating the ink jet printer.

To measure the filament length according to the present invention, a narrow charging electrode 40 (see FIG. 1) is located near the end of the ink jet filament, and a low charging voltage insufficient to cause substantial drop deflection is placed on the narrow charging electrode. The stimulation amplitude is initially adjusted to a low level to allow the length of the filament 20 to approach its natural unstimulated length (shown in phantom in FIG. 1). The stimulation amplitude is then monotonically increased, while the charge imparted to the ink jet is monitored by the electrometer 62.

As the stimulation amplitude is increased, the ink jet filament becomes shorter, and the ink drop separation point approaches the narrow charging electrode 40. Because the electrical field is strongest in the immediate vicinity of the narrow charging electrode, the amount of charge imparted on the ink drop increases as the break off point approaches the narrow electrode. The ink jet current registered by the electrometer reflects this increase in charge and thereby provides a signal that is proportional to the length of the ink jet filament. FIG. 3 is a graph showing the measured ink jet current as a function of the stimulation amplitude (as measured by the feedback voltage). As the ink jet is driven into overdrive, the ink jet filament begins to lengthen, and the jet current experiences a corresponding decline. Comparing FIGS. 2 and 3, it is seen that the measured jet current accurately reflects the change in filament length as the stimulation amplitude is varied. This measurement is independent of and unaffected by corresponding changes in drop separation phase. The ink jet current measurement provides an accurate indication of the relationship between stimulation amplitude and ink jet filament length regardless of changes in ink viscosity, temperature and pressure.

Figure 4:
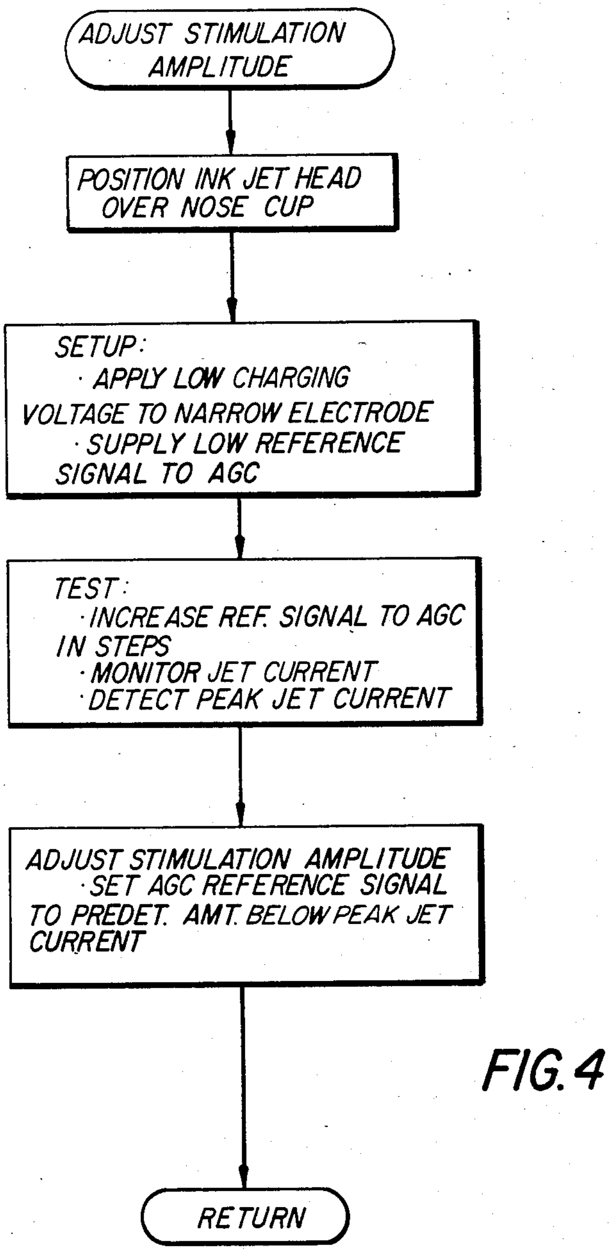
FIG. 4 is a flow chart illustrating the steps in the method of filament length measurement according to the present invention.

One mode of employing the filament length measuring apparatus in an ink jet printing apparatus to adjust stimulation amplitude will now be described with reference to the flow chart in FIG. 4. With the ink jet printing head located over the nose cup as shown in FIG. 1, the system control microprocessor signals the charging signal generator to apply the low charging voltage (e.g., 50 volts) to the narrow charging electrode 40, and provides a reference level to the automatic gain control circuit 54 predetermined to produce a minimum level of stimulation. The system control microprocessor then increases the stimulation reference signal in increments while monitoring the jet current signal provided by the electrometer 62. The jet current signal is recorded and a peak is detected representing the entry into overdrive. The stimulation amplitude is then set at some predetermined point below the peak that is found to provide reliable stimulation by computing the reference level as a function of the reference level at the peak. For example, the reference level may be set to the stimulation amplitude at the peak minus 25 mV.

In a multi-jet print head, where the jet-to-jet filament variation is small, such as the print head described in the U.S. patent application No. 390,105 cited above, the stimulation adjustment procedure is applied to all the jets simultaneously, and the stimulation adjustment is based on the average jet length detected by the sum of all the jet currents incident on the electrometer.

If the filament length varies considerably from jet to jet in a multi-jet ink jet printing head, due for example to nonuniform stimulation of the jets, the filament length measurement procedure described above may be applied to each jet independently to determine a filament length versus stimulation amplitude relation for each jet. A stimulation voltage can then be selected such that none of the filaments are overdriven. Individual jets in a multi-jet ink jet printing head of the type shown in FIG. 1 may be selected for measurement by charging all the jets except the one to be measured with a catch potential, thereby deflecting all the jets except the one being measured into the catcher 34.

Figure 6:
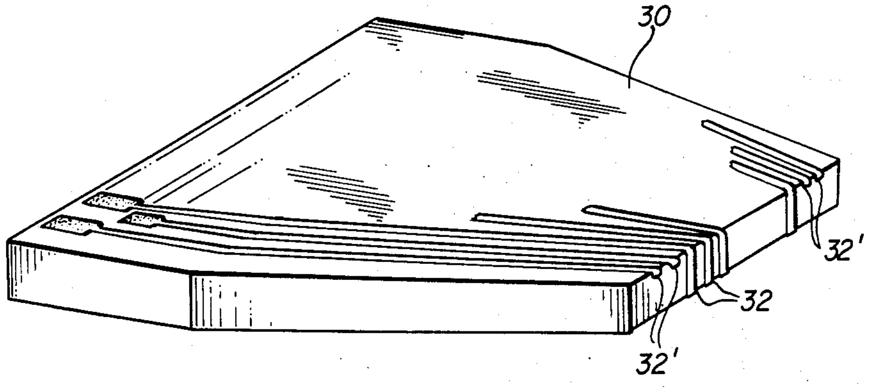
FIG. 6 is a perspective view of an ink jet print head having shortened guard jet electrodes according to the present invention.

An alternative to providing the narrow charging electrode 40 opposite the regular charging electrode 32, is to shorten the regular charging electrode 32 to a length of about 1 drop spacing. In a multi-jet printing head of the type shown in FIG. 1, having 64 jets with two guard jets on each end, the guard jet electrodes were shortened to about 1 drop spacing in length. FIG. 6 is a perspective view of the modified charge plate, showing the normal length charging electrodes 32, and the modified guard jet electrodes 32'.

During the filament length measurement procedure employing the modified guard jet electrodes, a low charging voltage (e.g., 50 volts) is applied to the modified guard jet electrodes 32' and no voltage is applied to the normal charging electrodes 32. The stimulation amplitude is then varied while the jet current is monitored as described above. During normal operation, a high voltage (e.g., 150 volts) is applied to the modified guard jets 32' to cause the guard jets to be deflected into the drop catcher 34.

Alternatively, all of the electrodes may be shortened to about 1 drop spacing in length, and the length of each jet can be measured independently by applying a low charging voltage (e.g., 50 volts) to the electrodes one at a time, while varying the stimulation amplitude and measuring the jet current. With the shortened charging electrodes just described, an alternative to measuring the jet current by means of the electrometer in the nose cup 42 is to provide an electrometer in the ink gutter 36, and apply a voltage to the short charging electrodes of sufficient magnitude (e.g., 150 volts) to deflect the charged drops into the catcher. The ink jet current delivered to the ink gutter is then monitored while the stimulation amplitude is varied. The resulting measured jet current versus stimulation amplitude profile is similar to that shown in FIG. 3.

Figure 5:
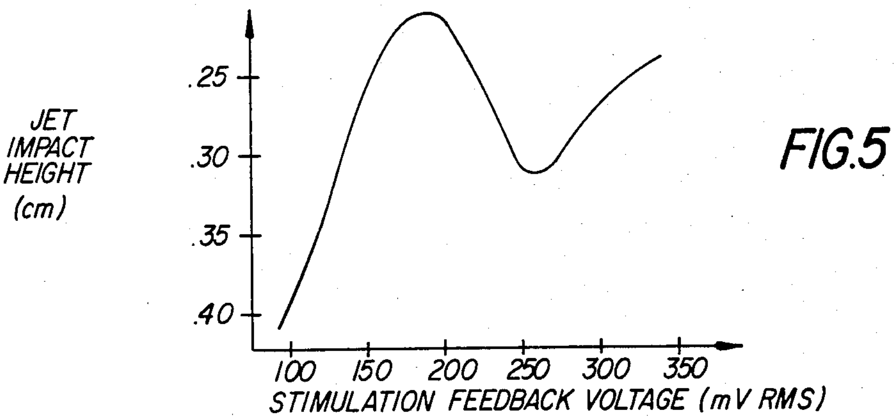
FIG. 5 is a plot showing the height of the ink jet impact on the face of the ink drop catcher as a function of stimulation amplitude.

In another alternative embodiment, the height of the ink jet impact on the catcher face is monitored as a function of the stimulation amplitude to determine the minimum filament length. FIG. 5 shows a plot of the height of the impact of the guard jets on the catcher face in an ink jet print head having modified guard jet electrodes like those shown in FIG. 6. As the drop break-off point approaches the short guard electrodes, the amount of charge on the guard jets increases, thereby increasing the deflection of the ink drops and causing the ink jet to impact higher on the face of drop catcher 34. Thus the height of the drop impact on the catcher face is a direct function of the filament length. The data in FIG. 5 was generated by visual observation of the guard jet impact height on the drop catcher face while the stimulation amplitude was varied.

Figure 7:
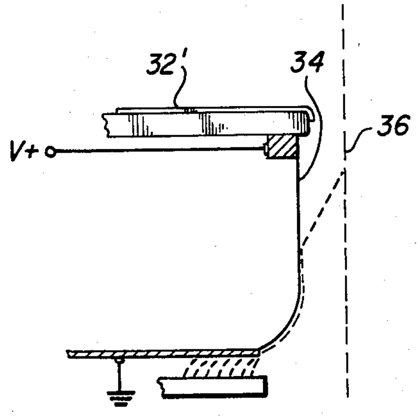
FIG. 7 is a schematic diagram of an impact height sensor useful in practicing one mode of the present invention.

The stimulation amplitude may be automatically adjusted by employing a sensor that measures the height of the ink jet impact on the face of catcher 34. FIG. 7 is a diagram showing apparatus for measuring the height of impact of the ink drops on the catcher face. Such an impact height sensor is the subject of U.S. patent application Ser. No. 765,973 filed Aug. 15, 1985 in the names of Piatt and Brown. The impact height sensor includes means for varying an electrical parameter (such as resistance) as a function of the ink jet impact height. In the example shown in FIG. 7, the face of the catcher 34 is a resistive material. A voltage V+ is applied across the face of the catcher from top to bottom. The ink jet stream 36 acts as the wiper on a potentiometer to vary the total resistance across the face of the catcher. The higher the impact of the jet, the less the resistance. The current flowing across the face of the catcher is monitored to determine the jet impact height.

Figure 8:
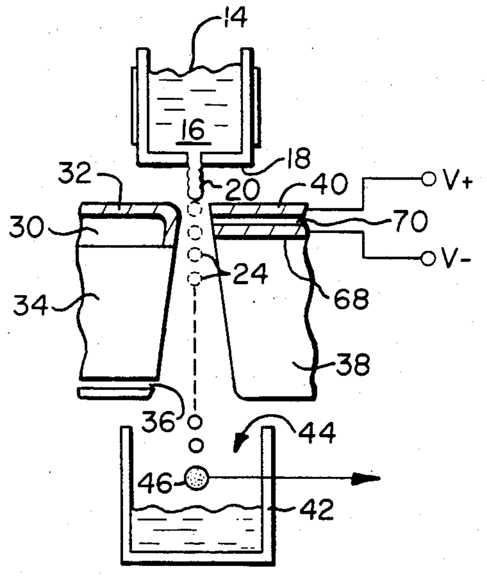
FIG. 8 is a schematic diagram illustrating an alternative mode of practicing the present invention.
Figure 9:
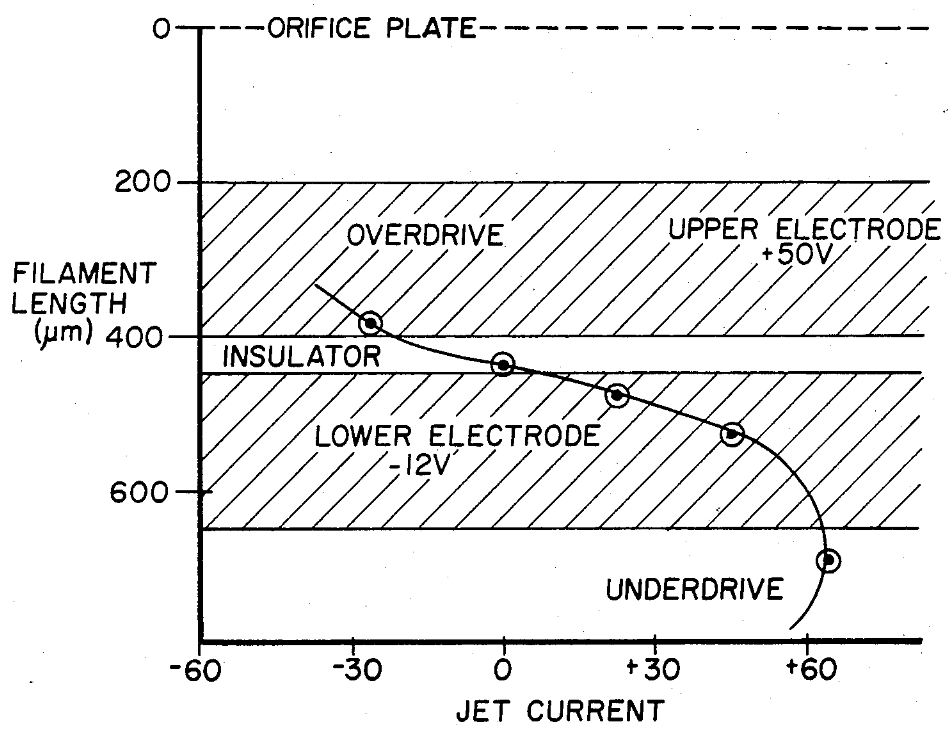
FIG. 9 is a plot showing the electrometer output as a function of the filament length for the mode illustrated in FIG. 8.

In an alternative mode of the present invention, a pair of narrow charging electrodes are employed as shown in FIG. 8 where elements similar to elements in FIG. 1 are similarly numbered. The narrow charging electrodes 40 and 68 are separated by a thin insulating strip 70. In operation, a positive voltage V+ is applied to the upper electrode 40, and a negative voltage V− is applied to the lower electrode 68. The voltages V+ and V− are selected such that a drop that breaks off adjacent the insulating strip 70 will receive a charge of zero volts. Drops breaking off above the insulating strip 70 will be negatively charged by the influence of electrode 40, and those breaking off below the insulating strip 70 will be positively charged by the influence of electrode 68. The distance of insulating strip 70 from charge plate 18 is set to the desired filament length, and during operation, the system control microprocessor controls the feedback signal so that the observed jet current is zero, thereby maintaining the filament length at the desired value. FIG. 9 shows a plot of the measured jet current versus filament length for the filament length sensor shown in FIG. 8.

The voltages employed for V+ and V− were +50 volts and −12 volts respectively. The voltages selected to produce zero drop charge when the drops break off across from the insulating strip 70 are not symmetrical, due to the influence of the orifice plate on the local electric field generated by the narrow charging electrodes. By means of this embodiment, the exact length of the ink jet filament can be more accurately determined.

ADVANTAGES AND INDUSTRIAL APPLICABILITY

The ink jet filament length sensor and stimulation setting apparatus is useful in ink jet printers. The apparatus has the advantage that the ink jet filament length can be measured directly, independent of drop separation phase and therefore, the stimulation amplitude can be more reliably set to avoid the region of overdrive.

We claim:

1. A method for sensing the length of an ink jet filament in response to stimulation amplitude in a continuous ink jet printer, characterised by:

locating a narrow charging electrode, extending less than or equal to one drop spacing in the direction of the ink jet filament, adjacent the ink jet filament and applying a charging voltage to the narrow electrode;

changing the amplitude of the stimulation signal to change the length of the ink jet filament;

detecting the magnitude of the charge imparted to the ink drops by the narrow charging electrode; and sensing the length of the ink jet filament as a function of the detected charge.

2. The method for sensing the length of an ink jet filament claimed in claim 1, further characterized by:

the charging voltage being a low voltage insufficient to deflect a charged ink drop into a catcher; and the charge being detected by an electrometer located in a nose cup.

3. The method for sensing the length of the ink jet filament claimed in claim 2, further characterized by:

the narrow charging electrode being located opposite a planar charging electrode.

4. The method of sensing the length of an ink jet filament claimed in claim 1, further characterized by:

said narrow charging electrode also functioning as a normal charging electrode for the ink jet print head.

5. The method for sensing the length of an ink jet filament claimed in claim 4, further characterized by:

said charging voltage being a high voltage sufficient to deflect charged drops into a catcher, and the charge being detected by an electrometer located in the catcher.

6. The method for sensing the length of an ink jet filament claimed in claim 4, further characterized by:

said charging voltage being a high voltage sufficient to deflect charged drops into a catcher, and the charge being detected by means for sensing the height of impact of the deflected ink drops on the catcher face.

7. A method for adjusting the amplitude of stimulation in a continuous ink jet printer, characterized by:

locating a narrow charging electrode, extending less than or equal to one drop spacing in the direction of the ink jet filament, adjacent the ink jet filament and applying a charge voltage to the narrow electrode;

changing the amplitude of the stimulation signal to change the length of the ink jet filament;

detecting the amount of charge imparted to the ink drops by the narrow charging electrode;

sensing the stimulation amplitude that produces the shortest ink jet filament by sensing a peak in the detected charge as the amplitude is varied; and setting the amplitude of the stimulation signal a predetermined amount below the amplitude effective to cause the shortest ink jet filament.

8. The method for adjusting the amplitude of stimulation in a continuous ink jet printer claimed in claim 7, characterized by:

the charging voltage being a low voltage insufficient to deflect a charged ink drop into a catcher; and the charge being detected by an electrometer located in a nose cup at a storage and start-up location.

9. The method for adjusting the amplitude of stimulation in a continuous ink jet printer claimed in claim 8, characterized by:

the narrow charging electrode being located opposite a planar charging electrode.

10. The method for adjusting the amplitude of stimulation in a continuous ink jet printer claimed in claim 7, characterized by:

said narrow charging electrode also functioning as a normal charging electrode for the ink jet printer.

11. The method for adjusting the amplitude of stimulation in a continuous ink jet printer claimed in claim 10, characterized by:

said charging voltage being a high voltage sufficient to deflect charged drops into a catcher, and the charge being detected by an electrometer located in the catcher.

12. The method for adjusting the amplitude of stimulation in a continuous ink jet printer claimed in claim 10, characterized by:

said charging voltage being a high voltage sufficient to deflect charged drops into a catcher, and the charge being detected by means for sensing the height of impact of the drops on a catcher face.

13. Apparatus for sensing the length of an ink jet filament in response to stimulation amplitude in a continuous ink jet printer, characterized by:

a narrow drop charging electrode, extending less than or equal to one drop spacing in the direction of the ink jet filament, located adjacent the ink jet filament;

means for applying a charging voltage to the narrow drop charging electrode;

means for applying a stimulation signal of varying amplitude to the ink jet head; and means for detecting the amount of charge imparted to the ink drops by the narrow charging electrode.

14. The filament length sensing apparatus claimed in claim 13, further characterized by:

said charging voltage being a low voltage insufficient to deflect the charged ink drops into a catcher; and said charge magnitude detecting means being an electrometer having a sensing electrode located in a nose cup at a storage and start-up station in the ink jet printer.

15. The filament length sensing apparatus claimed in claim 14, further characterized by:

the ink jet print head having a planar charging electrode; and said narrow charging electrode being located opposite said planar charging electrode.

16. The filament length sensing apparatus claimed in claim 13, further characterized by:

said narrow charging electrode being the normal charging electrode of the ink jet printer.

17. The filament length sensing apparatus claimed in claim 16, further characterized by:

said charging voltage being a high voltage sufficient to deflect charged drops into a catcher; and the means for detecting the amount of charge comprising an electrometer located in the ink jet catcher.

18. The filament length sensing apparatus claimed in claim 16, characterized by:

said charging voltage being a high voltage sufficient to deflect charged drops into a catcher; and said charge detecting means comprising means for sensing the height of impact of the ink drops on a catcher face.

19. Apparatus for adjusting stimulation amplitude in a continuous ink jet printer, characterized by:

a narrow charging electrode, extending less than or equal to one drop spacing in the direction of the ink jet filament, located adjacent the ink jet filament;

means for applying a charging voltage to the narrow charging electrode;

means for varying the amplitude of the stimulation signal applied to the ink jet print head;

means for detecting the amount of charge imparted to the ink drops by the narrow charging electrode;

means for detecting the peak charge imparted to the ink drops; and means for setting the stimulation amplitude a predetermined amount below the amplitude producing the peak charge on the ink drops.

20. The stimulation amplitude adjusting apparatus claimed in claim 19, further characterized by:

said charging voltage being a low voltage insufficient to deflect the charged ink drops into a catcher; and said charge magnitude detecting means comprising an electrometer having a sensing electrode located in a nose cup at a storage and start-up station in the ink jet printer.

21. The stimulation amplitude adjustment apparatus claimed in claim 20, further characterized by:

the ink jet print head having a planar charging electrode; and said narrow charging electrode being located opposite said planar charging electrode.

22. Stimulation amplitude adjustment apparatus as claimed in claim 19, further characterized by:

said narrow charging electrode being the normal charging electrode of the ink jet printing apparatus.

23. Stimulation adjustment apparatus claimed in claim 22, further characterized by:

said charging voltage being a high voltage sufficient to deflect charged drops into a catcher; and said means for detecting the amount of charge imparted to the drops comprising an electrometer located in the catcher.

24. Stimulation amplitude adjusting apparatus claimed in claim 23, further characterized by:

said charging voltage being a high voltage sufficient to deflect charged drops into a catcher; and said means for detecting the amount of charge imparted to the ink drops comprising means for sensing the height of impact of the ink drops on the catcher face.

25. A method for sensing the length of an ink jet filament in response to stimulation amplitude in a continuous ink jet printer, characterized by:

locating a pair of narrow charging electrodes, extending less than or equal to one drop spacing in the direction of the ink jet filament, separated by a thin insulating strip adjacent the ink jet filament and applying charging voltages of opposite polarity to said narrow charging electrodes;

changing the amplitude of the stimulation signal to change the length of the ink jet filament;

detecting the magnitude of the charge imparted to the ink drops by the narrow charging electrode; and sensing the length of the ink jet filament as a function of the detected charge.

26. The method for sensing the length of an ink jet filament claimed in claim 25, further characterized by:

the charging voltages being of such a magnitude that ink drops that separate opposite said insulating strip receive a charge of zero volts, and sensing when the charge imparted to the ink drops is zero volts.

27. A method for adjusting the amplitude of stimulation in a continuous ink jet printer characterized by:

locating a pair of narrow charging electrodes, extending less than or equal to one drop spacing in the direction of the ink jet filament, separated by a thin insulating strip adjacent the ink jet filament and applying charging voltages of opposite polarity to said charging electrodes, said charging voltages being of such a magnitude that drops breaking off adjacent to said insulating strip receive a charge of zero volts;

applying a stimulation signal to the ink jet print head;

sensing the charge imparted to the ink drops; and adjusting the amplitude of the stimulation signal until a charge of zero volts is imparted to the ink drops.

28. Apparatus for sensing the length of an ink jet filament in response to stimulation amplitude in a continuous ink jet printer, characterized by:

a pair of narrow drop charging electrodes, extending less than or equal to one drop spacing in the direction of the ink jet filament, separated by a thin insulating strip, located adjacent the ink jet filament;

means for applying charging voltages of opposite polarity to said narrow drop charging electrodes;

means for applying a stimulation signal of varying amplitude to the ink jet head; and means for detecting the amount of charge imparted to the ink drops by the narrow charging electrodes.

29. The filament length sensing apparatus claimed in claim 28, further characterized by: said charging voltages being of such magnitude that zero volts are induced on ink drops that break off adjacent said narrow insulating strip.

30. Apparatus for adjusting filament length in a continuous ink jet printer, characterized by:

a pair of narrow drop charging electrodes, extending less than or equal to one drop spacing in the direction of the ink jet filament, separated by a thin insulating strip located adjacent the ink jet filament at a predetermined distance from an orifice plate;

means for applying charging voltages of opposite polarity to said charging electrodes, of such a magnitude that ink drops breaking off adjacent said insulating strip received a charge of zero volts;

means for sensing the charge imparted to the ink drops; and means for adjusting the amplitude of the stimulation signal until a charge of zero volts is imparted to the ink drops, whereby the filament length is adjusted to said predetermined distance.

* * * * *